Figure 1:
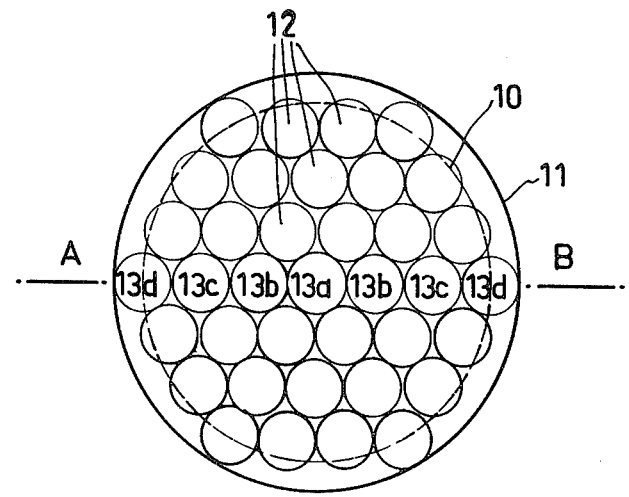

United States Patent [19]

Jatteau et al.

[11] 4,438,334

[45] Mar. 20, 1984

[54] GAMMA CAMERA COMPRISING A LOCALIZING SCINTILLATION INTENSIFIER

[75] Inventors: Michel Jatteau, Lesigny; Pierre H. Lelong, Gentilly; Jean Pergrale, Paris, all of France

[73] Assignee: U.S. Philips Corporation, New York, N.Y.

[21] Appl. No.: 257,015

[22] Filed: Apr. 24, 1981

[30] Foreign Application Priority Data

Apr. 29, 1980 [FR] France .................................. 80 09669

[51] Int. Cl.³ .............................................. G01T 1/20
[52] U.S. Cl. .............................................. 250/363 S
[58] Field of Search ................ 250/363 S, 369, 370

[56] References Cited

U.S. PATENT DOCUMENTS 4,272,678  6/1981  Lange ........................ 250/363 S Primary Examiner—Davis L. Willis
Attorney, Agent, or Firm—Paul R. Miller

[57] ABSTRACT

The invention relates to a gamma camera comprising a scintillation crystal, a light intesifier, an optical guide for dispersing the light, and a scintillation localizer. The light intensifier comprises a mosaic of independent, juxtaposed, identical modules, each of which comprises an entrance face and an exit face. The entrance face is provided with a photocathode and is optically coupled to the exit face of the scintillation crystal. The exit face is provided with a screen and is coupled to the scintillation localizer.

10 Claims, 4 Drawing Figures

GAMMA CAMERA COMPRISING A LOCALIZING SCINTILLATION INTENSIFIER

The invention relates to a gamma camera which comprises an optical guide and a localizing scintillation intensifier which comprises a mosaic of intensifier modules.

Scintillation intensification in such cameras serves to improve the spatial resolution. Cameras which comprise a scintillation localizer with a network of photodetectors and which also comprise an image intensifier are described in the article by A. Lansiart et al in "Proceedings of Symposium on Medical Radioisotope Scintigraphy", Vol. 1, pages 87 to 98, IAEA Vienna, 1969.

The scintillation crystal in these cameras is directly coupled to the entrance face of the light intensifier which reduces the dimensions of the image. The light spot produced on the screen of the intensifier tube by each scintillation activates a group of four photomultipliers. Signals derived therefrom can be used to determine the coordinates of the location of the scintillation with respect to a system of coordinates in the plane of the crystal.

These cameras have some drawbacks. One of these drawbacks concerns the optical coupling between the intensifier tube and the external scintillation crystal. Considering its diameter, the entrance window of the intensifier tube generally has a convex shape and is comparatively thick. The scintillation crystal arranged against the window will thus have a convex surface; this is one of the reasons why scintillation centers are situated far from the plane of the photocathode. It is to be noted that the photo-electrical properties of the cathode and of the screen of the intensifier tube are suitably uniform across the entire surface. Irregularities could cause differences in the light intensification, which would falsify the results of the localizer as regards the position of the bary center as well as the value of the energy measured. Such a uniformity is difficult to realize for surfaces having a diameter as required for the scintillation crystal.

The results are also falsified by the image reduction. The image reduction causes geometrical distortions of the image and also necessitates very high precision as regards the localization of the scintillations. The localizer associated with the camera should be capable of measuring with precision and of performing corrections of linearity errors in the image. Therefore, the localizer should in first approach comprise a large number of photodetectors, which is contrary to field reduction.

British Patent Specification No. 2,016,206 describes a gamma camera in which the scintillation crystal is shaped as a plate which comprises parallel faces and which is associated with an image intensifier tube comprising a curved metal entrance window (or flat but including a collimator). This device operates without image reduction. However, this tube involves the described drawbacks as regard to the uniformity of the photocathode and the screen and further drawbacks which are due to the shape of the entrance window, for example, the loss of spatial resolution in the case of a curved entrance window and the fact that the collimator cannot be exchanged in accordance with the desired performance. Moreover, the dimensions of such a tube are limited, so that the dimensions of the useful field of the cameras are also limited. The solution described therein for field limitation by juxtaposing several cameras of the described kind has the drawback that large blind zones are formed in the useful field.

The invention has for its object to provide a gamma camera in which these drawbacks to not occur. To this end, a gamma camera of the kind set forth in accordance with the invention is characterized in that the scintillation intensifier comprises a mosaic of juxtaposed, identical intensifier modules with a magnification of approximately 1, and with the modules comprising a photocathode on the side of the scintillation crystal and a screen on the side of the optical guide.

In accordance with the invention, the scintillation crystal remains shaped as a plate comprising parallel flat sides whose diameter is not limited by the detection system in the presence of the intensifier. The intensifier is constructed so that the intensification is substantially uniform across the entire surface of the scintillation crystal and so that no or only little image reduction occurs. As a result, the photoelectric image of every scintillation appears on the screen with fewer geometrical distortions and the localizer may comprise a large number of photodetectors like, for example, in the Anger camera. Moreover, the surface of the intensifier may have a variety of shapes adapted to the crystal.

Each of the modules comprises a tube having a spectral cathode sensitivity which is adapted to the scintillation light and with a screen having a low afterglow persistence. The spectral emission of the exit screen is adapted to the spectral sensitivity of the successive photodetectors. The detection surfaces may have different geometrical shapes and may be polygonal, so that they suitably adjoin and form a quasi-uninterrupted detection surface.

In a preferred embodiment, each intensifier module is formed by a proximity focusing diode tube, comprising a photocathode and an anode screen with, the localizer preferably comprising photomultipliers in view of the comparatively low intensification of the intensifier.

In a further embodiment, the intensifier modules comprise two image inverter tubes which have a magnification factor $-1$ and which are arranged one over the other with, the screen of the first tube having a relative spectral sensitivity characteristic which is comparable to that of the photocathode of the second tube. Because the intensification in this embodiment is higher than that of the former embodiment, the localizer may comprise semiconductor photodetectors whose gain is lower than that of the photomultipliers comprising dynodes.

In a further preferred embodiment, the intensifier modules comprise microchannel plates with secondary electron emission and proximity focusing. The intensification is again so high that the use of a localizer comprising semiconductor photodetectors suffices.

The invention will be described in detail hereinafter with reference to the accompanying diagrammatic drawing.

Figure 2:
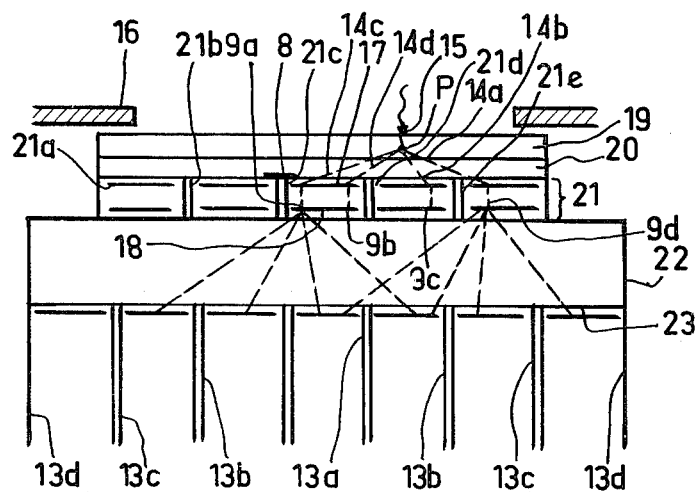
Figure 3:
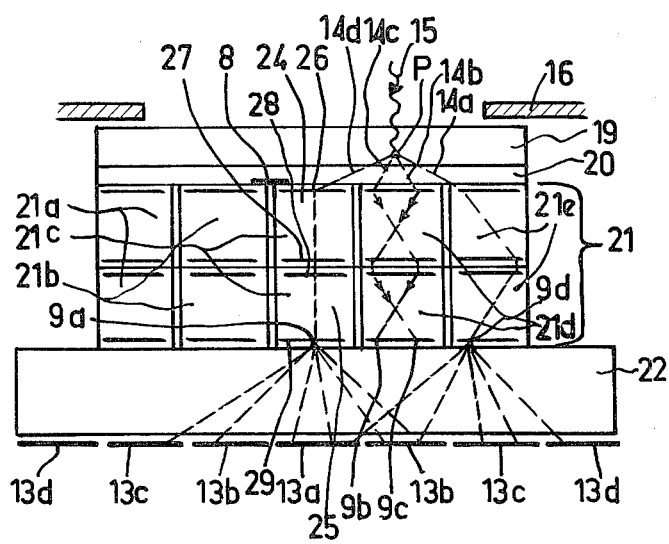
Figure 4:
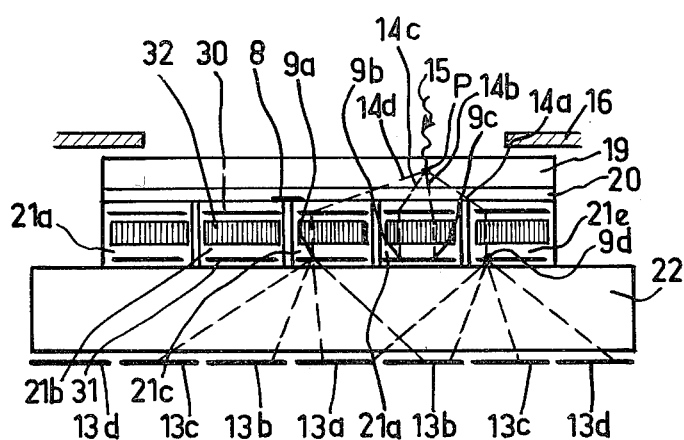

FIG. 1 shows the camera in accordance with the invention, viewed from the side of the localizer, FIG. 2 is a sectional view, taken along the line AB through a plane perpendicular to that of FIG. 1, of a first embodiment in accordance with the invention, FIG. 3 is a sectional view through the same plane of a second embodiment in accordance with the invention, and FIG. 4 is a sectional view through the same plane of a third embodiment in accordance with the invention.

FIG. 1 shows a camera in accordance with the invention, viewed from the side of the localizer. This Figure concerns, by way of example, a circular camera and the broken circle 10 and the circle 11 denote the contours of the scintillation crystal and the optical guide, respsectively, viewed from the side of the localizer. The detectors constituting the localizer form a network 12 and are arranged on the optical guide opposite the crystal. The photodetectors are arranged, for example, in an hexagonal configuration about one central photodetector. Each circle denoted by an uninterrupted line represents the entrance phase of one of the photodetectors. The photodetector denoted by the reference numeral 13a is the central photodetector; the references 13b, 13c and 13d denote the photodetectors arranged according to the line AB with respect to the photodetector 13a, with each of these photodetectors being associated with one of the hexagons. For the sake of simplicity, two photodetectors which are symmetrical with respect to the photodetector 13a and which are arranged according to the line AB are denoted by the same reference numeral.

FIG. 2 is a cross-sectional view of the entrance, taken along the line AB of FIG. 1, of a first embodiment of the camera. The scintillation crystal is denoted by the reference numeral 19, a protective window of, for example, pyrex glass of the scintillation crystal being denoted by the reference numeral 20, while the optical guide is denoted by the reference numeral 22. The optical guide is arranged underneath the scintillation crystal, but between this crystal provided with the protective window and the optical guide there is provided a light intensifier 21 comprising parallel faces which cover the entire surface of the crystal 19 with the light intensifier being formed by juxtaposed elements, some of which are denoted, viewed in a cross-sectional view according to the line AB, by the reference numerals $21_a$, $21_b$, $21_c$, $21_d$, $21_e$, respectively. In this embodiment, each of the modules is of the photodiode type with proximity focusing and each module is formed by a photocathode situated opposite the scintillation crystal and by a screen. For example, for the element $21c$, the photocathode is denoted by the reference numeral 17 and the screen by the reference numeral 18. The surfaces of the photocathode and of the screen of the modules preferably form regular polygons, for example, hexagons or squares, so that these modules suitably adjoin one another. The useful field of the camera is limited by the diaphragm 16 arranged opposite the scintillation crystal 19. In FIG. 2, the assembly formed by the photodetectors 13a, 13b, 13c, 13d which together form the scintillation localizer is accommodated on the surface 23 of the optical guide 22. In this embodiment the photodetectors are formed by photomultipliers comprising high-gain dynodes because of the comparatively low intensification of the light intensifier. In this embodiment, like in all other embodiments described, the intensifier modules have a spectral sensitivity which corresponds to the emission spectrum of the scintillation crystal. On the other hand, the sensitivity spectrum of the photodetectors corresponds to the spectrum of the light emitted from the exit of the intensifier. In a real embodiment, the scintillation crystal is made of sodium iodide ($IN_a$) doped with thallium which emits blue light (wavelength around 4100 Å); the photocathode of the intensifier is of the bialkaline type. The screen thereof is a fluorescent substance of the type P16 which emits blue light. The cathodes of the photomultipliers of the localizer are of the bialkaline type. The ondulated arrow 15 denotes the arrival of a γ photon in the crystal so that at the point P a scintillation is produced which radiates, for example, according to the rays 14a, 14b, 14c, 14d. The photons transported by these rays are intensified in the intensifier modules 21a to 21e, with the result that for this scintillation on the output of modules n bright dots, are formed, such as the points 9a, 9b, 9c, 9d, which in their turn radiate to the photodetectors 13a to 13d of the localizer which determines the coordinates of the scintillation point P on the basis of the coordinates of the n bright dots, the spatial resolution then being increased according to a ratio $$\frac{1}{\sqrt{n}}$$

in accordance with theory (see the article by Lansiart et al).

In this embodiment and also in the other embodiments, the window 20 comprises, to the right of the spaces between the modules, a reflective surface on the side of the scintillation crystal 19 in order to prevent a part of the scintillation radiation from being lost between two intensifier modules, so that it would not be intensified, which could make the modular character of the intensifier visible in the image. The reference numeral 8 denotes a part of this surface between the modules 21b and 21c. Any ray produced by a scintillation and directed onto the reflective surface is returned to the crystal where it is scattered again to an intensifier module, thus increasing the efficiency of the conversion of gamma or X-rays into useful light.

FIG. 3 is a sectional view, taken along the line AB of FIG. 1, of the entrance of a second embodiment of the camera. Corresponding references in this Figure denote corresponding elements with respect to FIG. 2. The light intensifier 21 comprises the modules 21a, 21b, 21c, 21d and 21e along the line AB. Each of these modules comprises two cascade-connected stages which are arranged one over the other and which are formed by two image inverter light intensifier tubes (negative magnification). For example, the tubes in the module 21c are denoted by the reference numerals 24 and 25. The photocathode of the tube 24 is denoted by the reference numeral 26 and the screen of the tube is denoted by the reference numeral 27, the corresponding components of the tube 25 being denoted by the reference numerals 28 and 29, respectively. The photocathode and the screen of the tubes have substantially the same geometry and surfaces, so that they provide a magnification of approximately −1. Due to the double inversion inside each module, the resultant magnification of the intensifier equals approximately 1 and on the assembly formed by the exit screens, for example, the assembly 29, a direct image of the scintillation on the exit of the scintillation crystal appears. It will be clear that the two stages constituting each intensifier module are capable of realizing magnifications other than −1 and are the inverse of one another, and that it is also possible to accommodate both stages in one and the same tube. The spectral sensitivities of the photocathode and the screen are comparable for the coupled elements, for example, the elements 27 and 28, so that the conversion efficiency is maximum. Taking into account the high intensification of the light intensifier, the localizer may be realized by means of photodetectors having a comparatively low intensification. These photodetectors are, for example, photodiodes which are formed by semiconductor plates. These plates are arranged on the optical guide 22 and are denoted, in a sectional view taken along the line AB, by the reference numerals 13a, 13b, 13c, 13d. Like in FIG. 2, FIG. 3 indicates the detection of the scintillation point P.

FIG. 4 is a sectional view, taken along the line AB, of a third embodiment of the camera. The constituent elements of this camera are denoted by the reference numerals used in the FIGS. 2 and 3. The modules constituting the intensifier are of the type comprising a microchannel plate with secondary electron emission. In FIG. 4, the plate of the module 21b is denoted by the reference numeral 32, while the photocathode and the screen are denoted by the reference numerals 30 and 31, respectively. Again taking into account the high intensification of these modules, the localizer can be realized by means of photodiodes which are formed by semiconductor plates. These plates are shown in the sectional view taken according to the line AB and are denoted by the reference numerals 13a, 13b, 13c, 13d. Like in the FIGS. 2 and 3, FIG. 4 indicates the detection of the scintillation point P.

What is claimed is:

1. In a gamma camera which comprises: a scintillation crystal; a protecting window which is transparent to scintillation radiation produced in the crystal disposed adjacent said crystal; a light intensifier for receiving scintillation light from said crystal through said window; an optical guide for scattering light from the intensifier; and a scintillation localizer, comprising an array of photodetectors having input faces directed toward the optical guide; the improvement wherein said light intensifier comprises a mosaic of juxtaposed, identical intensifier modules, each having a magnification of approximately one, and each of said modules comprising a photocathode disposed adjacent the scintillation crystal and a screen disposed adjacent the optical guide, wherein each module of the intensifier is a proximity focussed diode tube, and wherein the localizer comprises a network of photomultipliers.

2. The improvement according to claim 1, wherein the modules of the intensifier have a polygonal outer circumference.

3. The improvement according to claim 1, further including a reflective surface disposed between the scintillation crystal and the intensifier modules, approximately in the plane of the photocathode.

4. In a gamma camera which comprises: a scintillation crystal; a protecting window which is transparent to scintillation radiation produced in the crystal disposed adjacent said crystal; a light intensifier for receiving scintillation light from said crystal through said window; an optical guide for scattering light from the intensifier; and a scintillation localizer, comprising an array of photodetectors having input faces directed toward the optical guide; the improvement wherein said light intensifier comprises a mosaic of juxtaposed, identical intensifier modules, each having a magnification of approximately one, and each of said modules comprising a photocathode disposed adjacent the scintillation crystal and a screen disposed adjacent the optical guide, wherein each module of the intensifier comprises a first image intensifier tube stage and a second image intensifier tube stage arranged in cascade, the first stage comprising a screen and the second stage comprising a photocathode which coincides with the screen of the first stage, and wherein the localizer comprises a network of semiconductor photodiodes.

5. The improvement of claim 4 wherein each stage has unitary magnification.

6. The improvement of claim 4 wherein the magnification of one of the stages is the inverse of the magnification of the other stage.

7. The improvement according to claim 4, wherein the modules of the intensifier have a polygonal outer circumference.

8. The improvement according to claim 4, further including a reflective surface disposed between the scintillation crystal and the intensifier modules, approximately in the plane of the photocathodes.

9. In a gamma camera which comprises: a scintillation crystal; a protecting window which is transparent to scintillation radiation produced in the crystal disposed adjacent said crystal; a light intensifier for receiving scintillation light from said crystal through said window; an optical guide for scattering light from the intensifier; and a scintillation localizer comprising an array of photodetectors having input faces directed toward the optical guide; the improvement wherein said light intensifier comprises a mosaic of juxtaposed identical intensifier modules, each having a magnification of approximately one, and each of said modules comprising a photocathode disposed adjacent the scintillation crystal and a screen disposed adjacent the optical guide, wherein each module of the intensifier is a proximity focussed diode tube, wherein the localizer comprises a network of photomultipliers, and wherein each module of the intensifier comprises said photocathode, a microchannel plate having secondary electron emission characteristics, and said screen.

10. In a gamma camera which comprises: a scintillation crystal; a protecting window which is transparent to scintillation radiation produced in the crystal disposed adjacent said crystal; a light intensifier for receiving scintillation light from said crystal through said window; an optical guide for scattering light from the intensifier; and a scintillation localizer comprising an array of photodetectors having input faces directed toward the optical guide; the improvement wherein said light intensifier comprises a mosaic of juxtaposed, identical intensifier modules, each having a magnification of approximately one, and each of said modules comprising a photocathode disposed adjacent the scintillation crystal and a screen disposed adjacent the optical guide, wherein each module of the intensifier comprises a first image intensifier tube stage and a second image intensifier tube stage arranged in cascade, the first stage comprising a screen and the second stage comprising a photocathode which coincides with the screen of the first stage, wherein the localizer comprises a network of semiconductor photodiodes, wherein each module of the intensifier comprises said photocathode, a microchannel plate having secondary electron emission characteristics, and said screen, and wherein the localizer comprises said network of semiconductor photodiodes each formed by a semiconductor plate.

* * * * *